June 17, 1958  E. K. HANSEN  2,839,208
MATERIAL UNLOADING VEHICLE
Filed March 22, 1956  2 Sheets-Sheet 1
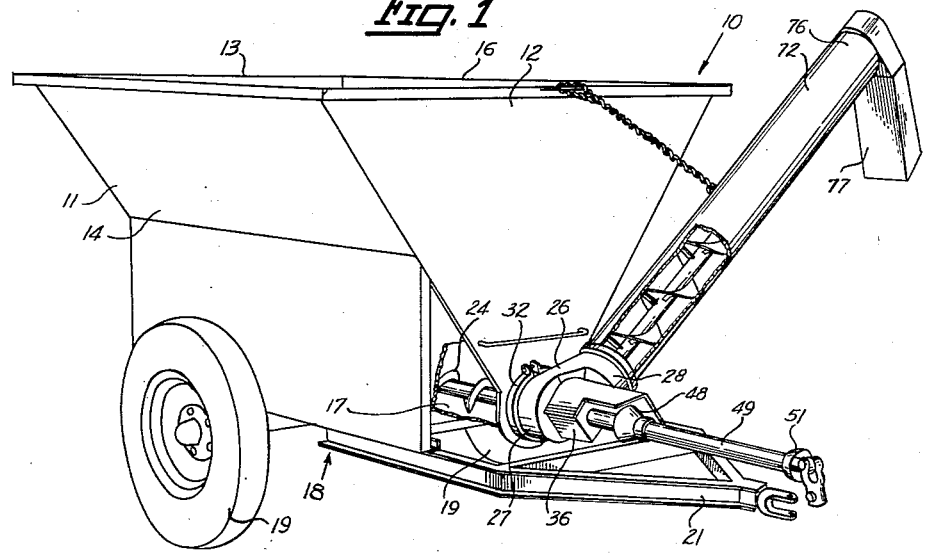
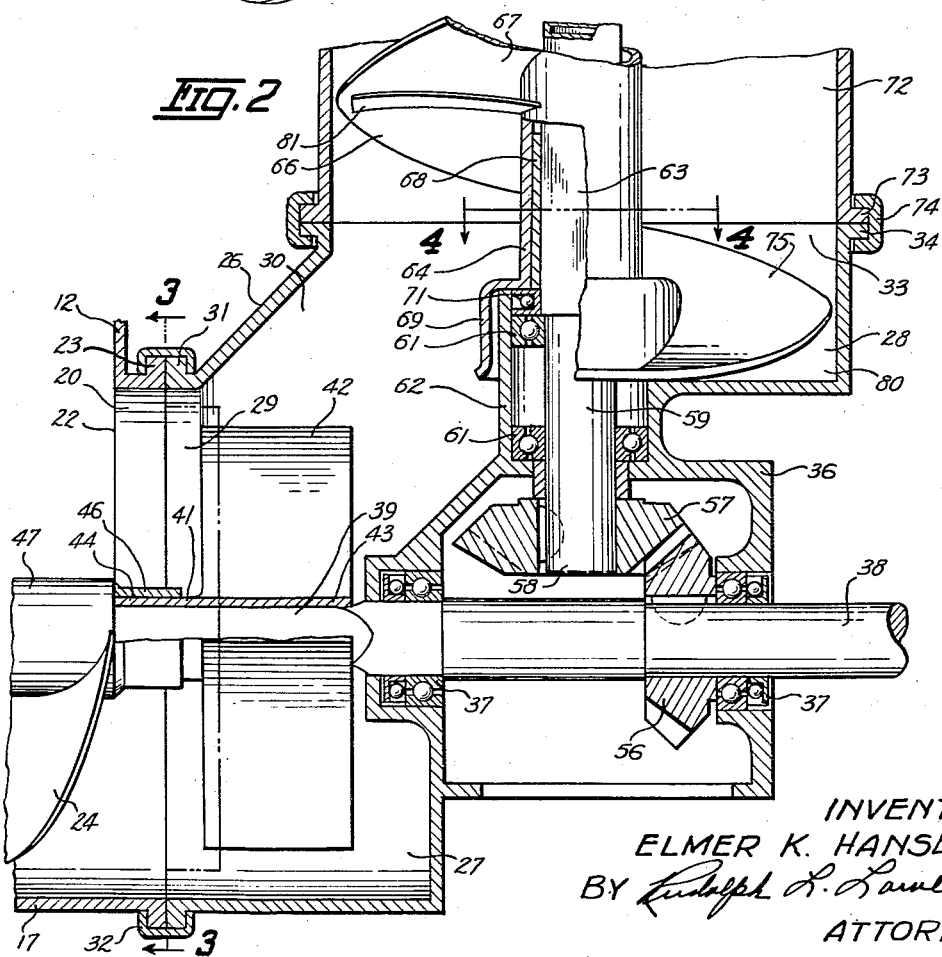
INVENTOR.
ELMER K. HANSEN
BY Rudolph L. Lowell
ATTORNEY.

June 17, 1958  E. K. HANSEN  2,839,208
MATERIAL UNLOADING VEHICLE
Filed March 22, 1956  2 Sheets-Sheet 2

INVENTOR.
ELMER K. HANSEN
BY
ATTORNEY.

United States Patent Office 2,839,208
Patented June 17, 1958

2,839,208

MATERIAL UNLOADING VEHICLE

Elmer K. Hansen, Sioux City, Iowa

Application March 22, 1956, Serial No. 573,147

3 Claims. (Cl. 214—522)

This invention relates generally to material handling apparatus and more particularly to a material unloading vehicle for use in unloading grain, ground livestock feed, and similar material into hoppers, feed bins and the like.

An object of this invention is to provide an improved material unloading vehicle.

A further object of this invention is to provide a material unloading vehicle which is operable to unload granular material continuously and at a controlled rate to a bin or feeding device.

A feature of this invention is the provision in a material unloading device which includes a material container having a conveyor and a discharge elevator, of a single shaft and gear arrangement, positioned out of the path of travel of material being unloaded, for driving both the conveyor and the elevator.

Another object of this invention is to provide a material unloading vehicle which is simple in construction, economical in cost and efficient in operation to quickly and completely unload grain or livestock feed to a desired location.

Figure 3:
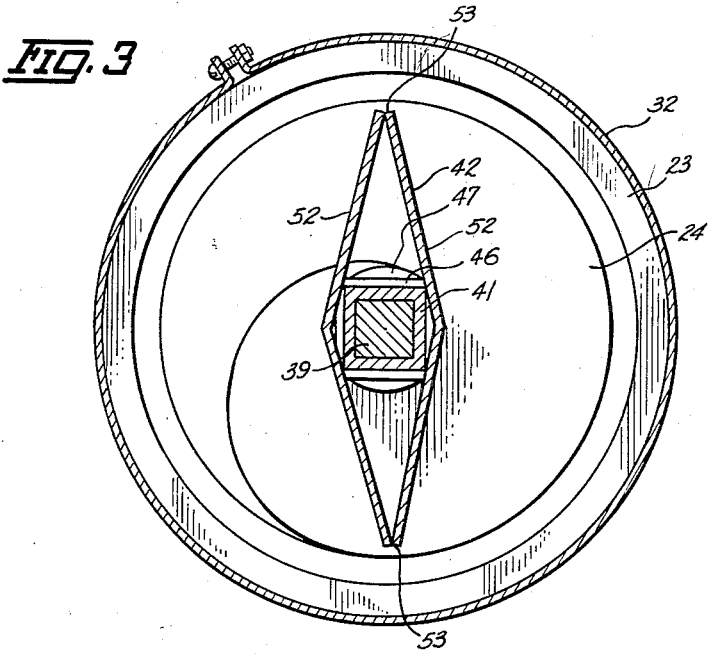
Figure 4:
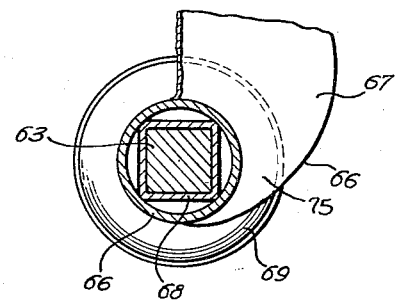

Further objects, features and advantages of this invention will become apparent from a consideration of the following description when taken in connection with the accompanying drawing in which:

Fig. 1 is a perspective view of the material unloading vehicle of this invention, with some parts broken away and other parts shown in section for the purpose of clarity;

Fig. 2 is an enlarged fragmentary longitudinal sectional view of a portion of the material conveying means in the material unloading vehicle of this invention as seen substantially along the line 2—2 in Fig. 1; and Figs. 3 and 4 are sectional views looking along the lines 3—3 and 4—4, respectively, in Fig. 2.

With reference to the drawing, the material unloading vehicle of this invention, indicated generally at 10, is illustrated in Fig. 1 as including a material container or box 11 of a substantially V-shape in transverse section. The box 11 has front and rear end walls 12 and 13, respectively, downwardly converging side walls 14 and 16 and a bottom wall 17. A portable frame 18, having wheels 19 and terminating at its front end in a tongue 21, supports the box 11.

Adjacent the lower end thereof, the front wall 12 is provided with a discharge opening or passage 22 (Fig. 2) which communicates with a forwardly extended tubular member 20 having a terminal upright flange 23. A feeding auger 24 supported in and extended longitudinally of the box 11 adjacent the bottom wall 17 thereof, moves material within the box 11 through the discharge opening 22 outwardly of the box 11.

Releasably mounted on the box front wall 12, at a position opposite the discharge opening 22, is a housing or casing 26 (Figs. 1 and 2) which is of a generally L-shape in longitudinal section. The housing 26 has a first leg portion 27 which is substantially upright and a second leg portion 28 which is angularly arranged relative to the first leg section 27 and is extended in a direction forwardly and away from the box 11. A forwardly and outwardly inclined housing portion 30 connects the leg portions 27 and 28. The first housing leg portion 27 has the rear side thereof open so as to constitute an inlet opening 29 for the housing 26.

As best appears in Fig. 2, the opening 29 is bounded by an upright flange 31 of a diameter corresponding to the flange 23 about the box discharge opening 22. The housing 26 is mounted on the front wall 12 by means of a split connector ring 32 which is of a substantially U-shape in transverse section and which straddles the flanges 23 and 31. Likewise, the housing leg portion 28 has the top side thereof open so as to constitute an outlet opening 33 for the housing 26, with the outlet opening 33 also being bounded by an outwardly directed flange 34 for a purpose to appear later.

Formed integral with the housing 26 at a position within the angle formed by the leg portions 27 and 28, is a gear casing 36 (Figs. 1 and 2) of a substantially rectangular shape. Mounted on bearings 37 carried by the casing 36, is a horizontally extended shaft 38 having a reduced substantially square portion 39 (Figs. 2 and 3) positioned within and extended transversely through the housing leg portion 27. Received on the square shaft portion 39, and in interlocking engagement therewith, is a square tube 41 which carries an impeller unit 42 at the forward end portion 43 thereof. The opposite end 44 of the tube 41 is received, for interlocking engagement, within a square tube portion 46 secured to and extended forwardly of the shaft portion 47 of the feeding auger 24.

It is seen, therefore, that the shaft 38 constitutes a forward extension of the shaft portion 47 of the feeding auger 24, with the support of the shaft 38 in the bearings 37 serving to support the front end of the feeding auger 24. The shaft 38 is connected, by means of a universal joint 48 (Fig. 1) to a telescoping shaft 49 which carries a second universal joint 51 adapted to be connected to a tractor power take off (not shown) or the like for driving the shaft 38. On rotation of the shaft 38, the feeding auger 24 operates to move material outwardly of the wagon box 11 through the discharge opening 22 and into the housing portion 27 in which the impeller unit 42 is located.

As best appears in Fig. 3, the impeller unit 42 consists of a pair of V-shape plates 52 positioned on opposite sides of the square tube 41. The plates 52 are connected together at their ends 53 and at their apices to the tube 41 for rotation therewith in response to a rotation of the shaft 38.

It is seen, therefore, that on rotation of the shaft 38, the feeding auger 24 and the impeller unit 42 are concurrently rotated. As a result, feed is discharged by the feeding auger 24 from the box 11 to the housing leg portion 27 with the impeller unit 42 acting to continuously move or throw this material in the housing portion 27 outwardly through the housing connecting portion 30 and into the housing leg portion 28.

A bevel gear 56, keyed to the shaft 38 at a position within the gear casing 36, is arranged in a driving relation with a second bevel gear 57 keyed to the inner end 58 of an upright shaft 59 positioned adjacent to and extended radially outwardly of the shaft 38. The shaft 59 is rotatably supported by a pair of axially spaced bearings 61 mounted within a tubular projection 62 on the housing 26 and extended within the housing leg portion 28.

Received in interlocking engagement on a square outer end portion 63 of the shaft 59 is the shaft portion 64 of a discharge auger 66 having a single spiral shape blade 67 provided with gussets or stiffeners 81. The shaft portion 64 has a section 68 which is of a square internal shape to provide for its locked mounting on the shaft portion 63. An enlarged circular terminal end section 69 of the shaft portion 64 is positioned about the tubular housing projection 62 and is supported in a direction axially on a bearing 71 carried by the projection 62.

It can thus be seen that on rotation of the shaft 38, the shaft 59 is likewise rotated by virtue of the engagement of the bevel gears 56 and 57. On rotation of the shaft 59, the discharge auger 66 is rotated to move material from the housing leg portion 28 through a tubular discharge conveyor member 72 in which the auger 66 rotates. The conveyor member 72 is provided at its inner end with a peripheral flange 73 which is connected to the flange 34 on the housing leg portion 28 by a split ring clamp 74 similar to the clamp 32. At its outer end 76, the conveyor member 72 terminates in a discharge spout 77 (Fig. 1).

Material is thus continuously moved by the auger 66 from the housing leg portion 28 through the tubular member 72 to the discharge spout 77, which is rotatable about the member 72. Further, the tubular conveyor member 72 is rotatable along with the housing 26 about the shaft 38 for discharging to either side of the box 11. On rotation of the member 72 and the housing 26 the flange 31 is rotated within the ring clamp 32.

In the operation of the unloading vehicle 10, after the box 11 is loaded, the tongue 21 is connected to a tractor draw bar or the like (not shown) and the vehicle 10 is towed to a desired point for discharging the material from the box 11. The universal connection 51 is connected to a tractor power take off (not shown) to drive the shaft 38. The auger 24 then operates to deliver material from the box 11 to the housing leg section 27, with the impeller unit 42 acting to move such material into the housing leg section 28.

As best appears in Fig. 2, the path of movement of the impeller unit 42 overlaps the path of travel of the auger blade 67. As a result, some of the material moved by the impeller unit 42 is delivered directly to the auger blade 67 for immediate travel through the conveyor member 72. The balance of the material moved by the impeller unit 42 is received in the chamber 80 in the housing leg section 28 for pickup by the inner end portion 75 of the auger blade 67. As best appears in Figs. 2 and 4, the auger blade portion 75 is of a generally cam shape, since it is of a progressively increasing width to facilitate the pick up thereby of material in the housing leg section 28. Thus, during each revolution of the auger 66, the impeller unit throws material directly onto the auger blade 67 and into the chamber 80 of the housing leg portion 28 for pick up by the cam shape blade portion 75.

As a result, material is fed by the impeller unit 42 both directly and indirectly to the auger 66. This material is discharged from the conveyor spout 77 which is manually manipulated along with the member 72 to insure a discharge of material at the desired location.

In the event any stringy material such as corn husks are contained in the feed or grain being moved through the conveyor 72, the cam shape of the blade portion 75 acts to move such material outwardly of the auger shaft portion 64 so that such material does not wrap about the shaft portion 64. Any stringy material is thus moved through the member 72 along with the grain or feed by the auger 66.

From the above description it is seen that the material unloading vehicle 10 of this invention includes the impeller 42 which is arranged to feed both directly and indirectly to the auger 66. As a result, a continuous unloading operation is assured and the box 11 can be unloaded in a minimum amount of time. The entire absence of any bearings or other structure in the path of travel of material being unloaded facilitates a fast and complete unloading of the box 11.

Although the invention has been described with respect to a preferred embodiment thereof, it is to be understood that it is not to be so limited since changes can be made therein which are within the scope of the appended claims.

I claim:

1. A material unloading vehicle comprising an upright longitudinally extended material container having a discharge opening in one end thereof, first auger means arranged in said container opposite said opening for moving material through said opening, a housing mounted on said container and having a first portion thereof arranged opposite said opening for receiving material moved therethrough, said housing having a second portion angularly arranged relative to said first portion and extended in a direction away from said container, second auger means mounted on said housing in material communication with said second portion for moving material outwardly thereof, a first shaft journaled on said housing and extended through said first portion for driving said first auger means, a second shaft journaled on said housing and extended through said second portion for driving said second auger means, coacting means on said shafts providing for a driving of one shaft in response to rotation of the other shaft, and an impeller member on said first shaft and within said first housing portion for moving material therefrom to the second housing portion.

2. A material unloading vehicle comprising an upright longitudinally extended material container having a discharge opening in one end thereof, first auger means arranged in said container opposite said opening for moving material through said opening, a housing mounted on said container and having a first portion thereof arranged opposite said opening for receiving material moved therethrough, said housing having a second portion angularly arranged relative to said first portion and extended in a direction away from said container, second auger means mounted on said housing in material communication with said second portion for moving material outwardly thereof, shaft means journaled on said housing and extended through said first portion for driving said first auger means, an impeller member mounted on said shaft means for rotation therewith at a position within said first housing portion, with said impeller member being operable to move material into said second housing portion, and with a portion of said second auger means being in the path of travel of some of the material moved by said impeller for receiving material directly therefrom.

3. For use with a material handling vehicle having a material container provided with a material discharge opening, a housing mounted on said container having a first portion for receiving material from said discharge opening, a second housing portion arranged opposite said discharge opening and spaced therefrom, means separating said two housing portions, first auger means arranged in said container for moving material through said opening into said first housing portion, second auger means mounted on said housing in material communication with said first housing portion for receiving material therefrom, a pair of shafts corresponding to said first and second auger means having end portions projected within said second housing portion, co-acting means on said shaft end portions providing for the driving of one shaft in response to rotation of the other shaft, and an impeller member on the shaft for said first auger means and located within said first housing portion for moving material from said first housing portion to said second auger means.

References Cited in the file of this patent

UNITED STATES PATENTS

| | | |
|---|---|---|
| 2,439,541 | Hall | Apr. 13, 1948 |
| 2,445,886 | Mulligan | July 27, 1948 |
| 2,481,860 | Miller | Sept. 13, 1949 |
| 2,572,099 | Bateman | Oct. 23, 1951 |
| 2,601,608 | Hansen | June 24, 1952 |
| 2,676,721 | Hansen | Apr. 27, 1954 |